(12) United States Patent
Kupratis

(10) Patent No.: US 8,371,806 B2
(45) Date of Patent: Feb. 12, 2013

(54) GAS TURBINE ENGINE HAVING CORE AUXILIARY DUCT PASSAGE

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 1519 days.

(21) Appl. No.: 11/866,547

(22) Filed: Oct. 3, 2007

(65) Prior Publication Data

US 2009/0092480 A1 Apr. 9, 2009

(51) Int. Cl.
*F02K 1/38* (2006.01)
*F01D 17/00* (2006.01)

(52) U.S. Cl. .................... 415/145; 415/148; 415/150

(58) Field of Classification Search .................. 415/145, 415/148, 150; 60/232, 235, 771, 262, 264; 239/265.19; 181/213, 220
See application file for complete search history.

(56) References Cited

U.S. PATENT DOCUMENTS

| | | | |
|---|---|---|---|
| 3,930,370 A | 1/1976 | Markowski et al. | |
| 3,974,646 A | 8/1976 | Markowski et al. | |
| 5,157,916 A | 10/1992 | Wynosky et al. | |
| 5,440,875 A | 8/1995 | Torkelson et al. | |
| 5,722,233 A | 3/1998 | Nikkanen et al. | |
| 5,771,681 A | 6/1998 | Rudolph | |
| 5,813,221 A | 9/1998 | Geiser et al. | |
| 5,826,424 A | 10/1998 | Klees | |
| 5,867,980 A | 2/1999 | Bartos | |
| 5,884,843 A * | 3/1999 | Lidstone et al. | 239/265.13 |
| 5,943,856 A | 8/1999 | Lillibridge et al. | |
| 5,947,412 A * | 9/1999 | Berman | 244/1 N |
| 6,048,171 A * | 4/2000 | Donnelly et al. | 415/145 |
| 6,055,805 A * | 5/2000 | El-Aini et al. | 60/226.1 |
| 6,070,407 A | 6/2000 | Newton | |
| 6,112,513 A * | 9/2000 | Catt et al. | 60/204 |
| 6,260,352 B1 | 7/2001 | Negulescu et al. | |
| 6,763,651 B2 * | 7/2004 | Shmilovich et al. | 60/39.092 |
| 6,786,038 B2 | 9/2004 | Lair | |
| 7,043,898 B2 | 5/2006 | Rago | |
| 7,107,756 B2 | 9/2006 | Rolt | |
| 7,159,383 B2 * | 1/2007 | Barton et al. | 60/226.1 |
| 7,966,826 B2 * | 6/2011 | Alkislar et al. | 60/770 |
| 2003/0150214 A1 | 8/2003 | Lair | |
| 2005/0109016 A1 | 5/2005 | Ullyott | |
| 2005/0214107 A1 * | 9/2005 | Gutmark et al. | 415/1 |

FOREIGN PATENT DOCUMENTS

GB  2038948 A  *  7/1980
GB  2119859 A  *  11/1983

* cited by examiner

*Primary Examiner* — Edward Look
*Assistant Examiner* — Jesse Prager
(74) *Attorney, Agent, or Firm* — Carlson, Gaskey & Olds PC

(57) ABSTRACT

A gas turbine engine system includes a nacelle assembly, a core engine and a mixer disposed between the nacelle assembly and the core engine. The core engine includes a core passage and a core auxiliary duct passage. The core auxiliary duct passage includes an inlet for receiving a portion of a core airflow form the core engine and an outlet for discharging a portion of the core airflow received from the core engine.

12 Claims, 4 Drawing Sheets

GAS TURBINE ENGINE HAVING CORE AUXILIARY DUCT PASSAGE

BACKGROUND OF THE INVENTION

This application relates to a gas turbine engine having a core auxiliary duct passage for diverting a portion of a core airflow from the core engine of the gas turbine engine.

In an aircraft gas turbine engine, such as a turbofan engine, air is pressurized in a compressor section and mixed with fuel in a combustor section for generating hot combustion gases. The hot combustion gases flow downstream through a turbine section that extracts energy from the gases. The turbine section powers a compressor section and a fan section disposed upstream of the compressor section.

Fan bypass airflow is communicated through a fan bypass passage that extends between a nacelle assembly and a core engine. The fan bypass airflow is communicated through an annular fan exhaust nozzle defined at least partially by the nacelle assembly surrounding the core engine. A majority of propulsion thrust is provided by the pressurized fan air that is discharged through the fan exhaust nozzle. The combustion gases are discharged through a core exhaust nozzle to provide additional thrust.

Mixed flow turbofan engines are known that include a mixer positioned between the nacelle assembly and the core engine at a position downstream from a turbine exit guide vane. The mixer typically includes a plurality of petals. The mixer drives core airflow from the core engine radially outward and into the petals of the mixer, and drives the fan airflow from the fan bypass passage radially inward to fill the petals of the mixer. The two airflow streams are co-mingled in the mixer and are subsequently communicated as a mixed stream through the exhaust nozzles of the gas turbine engine at a relatively equal velocity.

Mixed flow turbofans are known to provide noise reductions and improved propulsion efficiency of gas turbine engines. However, noise and efficiency issues remain a common area of concern in the field of gas turbine engines. Attempts have been made to increase the beneficial results achieved by mixed flow turbofan engines. Disadvantageously, these attempts have not been successful.

Accordingly, it is desirable to provide a gas turbine engine that achieves improved efficiency and noise reductions in a relatively inexpensive and non-complex manner.

SUMMARY OF THE INVENTION

A gas turbine engine system includes a nacelle assembly, a core engine positioned partially within the nacelle assembly, and a mixer disposed between the nacelle assembly and the core engine. The core engine includes a core passage and a core auxiliary duct passage. The core auxiliary duct passage includes an inlet for receiving a portion of a core airflow from the core engine and an outlet for discharging the portion of the core airflow received within the auxiliary duct passage. In one example, the controller produces a signal in response to detecting an operability condition and selectively translates the inlet and the outlet of the auxiliary duct passage in response to the operability condition.

A method of controlling a gas turbine engine having a core engine including a core passage and an auxiliary duct passage includes sensing an operability condition, and diverting a portion of a core airflow through the auxiliary duct passage in response to sensing the operability condition.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
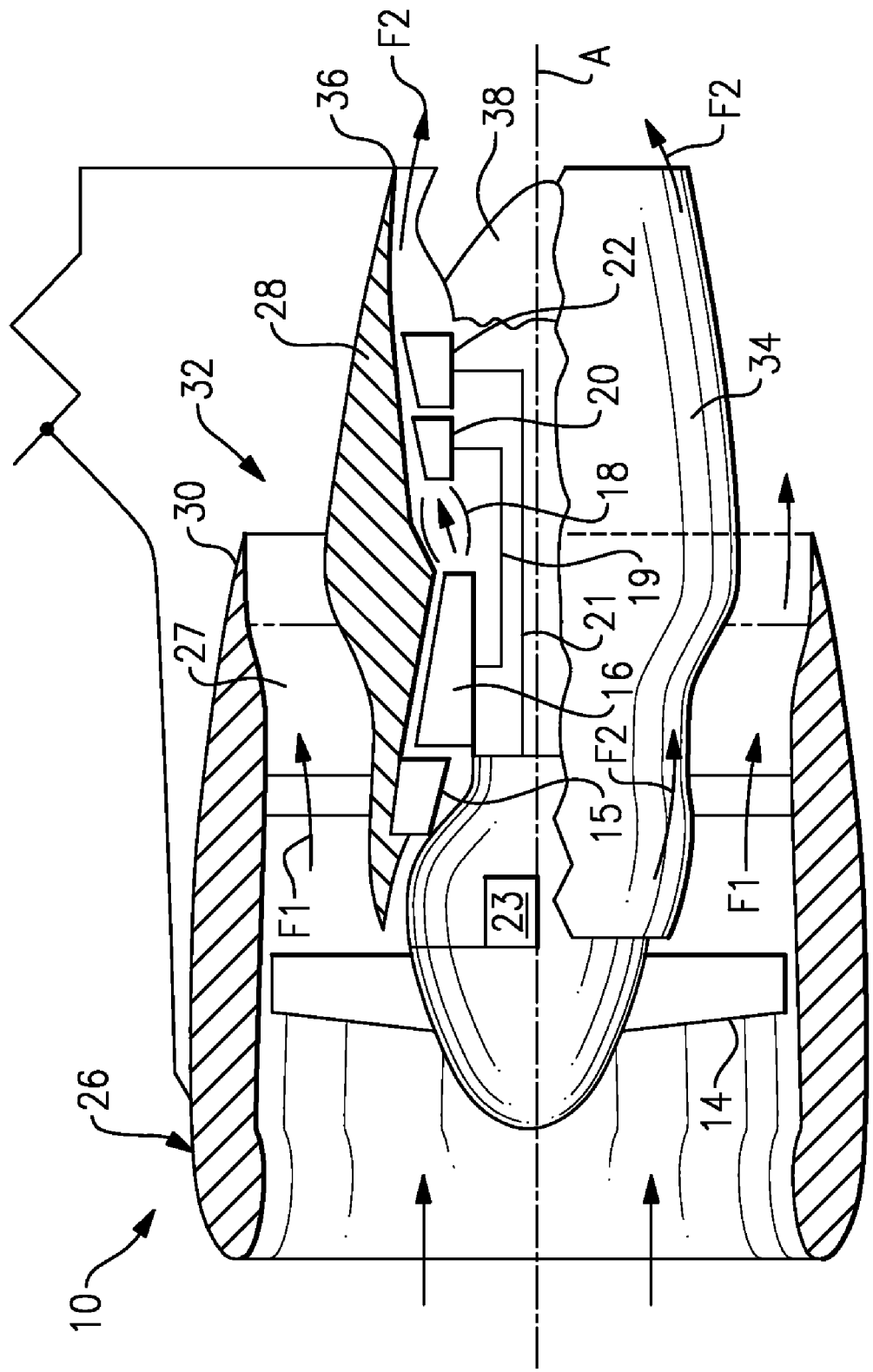
FIG. 1 illustrates a general perspective view of an example gas turbine engine.

FIG. 1 illustrates a gas turbine engine 10 that includes (in serial flow communication) a fan section 14, a low pressure compressor 15, a high pressure compressor 16, a combustor 18, a high pressure turbine 20 and a low pressure turbine 22 each disposed about an engine longitudinal centerline axis A. During operation, air is pressurized in the compressors 15, 16 and mixed with fuel in the combustor 18 for generating hot combustion gases. The hot combustion gases flow through the high and low pressure turbines 20, 22, which extract energy from the hot combustion gases. The high pressure turbine 20 powers the high pressure compressor 16 through a high speed shaft 19 and the low pressure turbine 22 powers the fan section 14 and the low pressure compressor 15 through a low speed shaft 21. The invention is not limited to the two-spool gas turbine architecture described and may be used with other architectures such as a single-spool axial design, a three-spool axial design and other architectures. That is, the present invention is applicable to any gas turbine engine, and to any application.

The example gas turbine engine 10 is in the form of a high bypass ratio engine mounted within a nacelle assembly 26, in which most of the air pressurized by the fan section 14 bypasses the core engine 28 for generating propulsion thrust. The nacelle assembly 26 partially surrounds the core engine 28. The airflow entering the fan section 14 may bypass the core engine 28 via a fan bypass passage 27 that extends between the nacelle assembly 26 and the core engine 28 for receiving and communicating a discharge airflow F1. The high bypass flow arrangement provides a significant amount of thrust for powering the aircraft.

The discharge airflow F1 is discharged from the engine through a fan exhaust nozzle 30 positioned adjacent a downstream end 32 of the nacelle assembly 26. Meanwhile, core airflow F2 is communicated through a core passage 34 of the core engine 28. Core airflow F2 is discharged from the core engine 28 through a core exhaust nozzle 36 that is defined between the core engine 28 and a tail cone 38 disposed coaxially therein around the longitudinal centerline axis A of the gas turbine engine 10. A bypass ratio is defined that represents the ratio of the fan discharge airflow F1 relative to the core airflow F2.

Figure 2A:
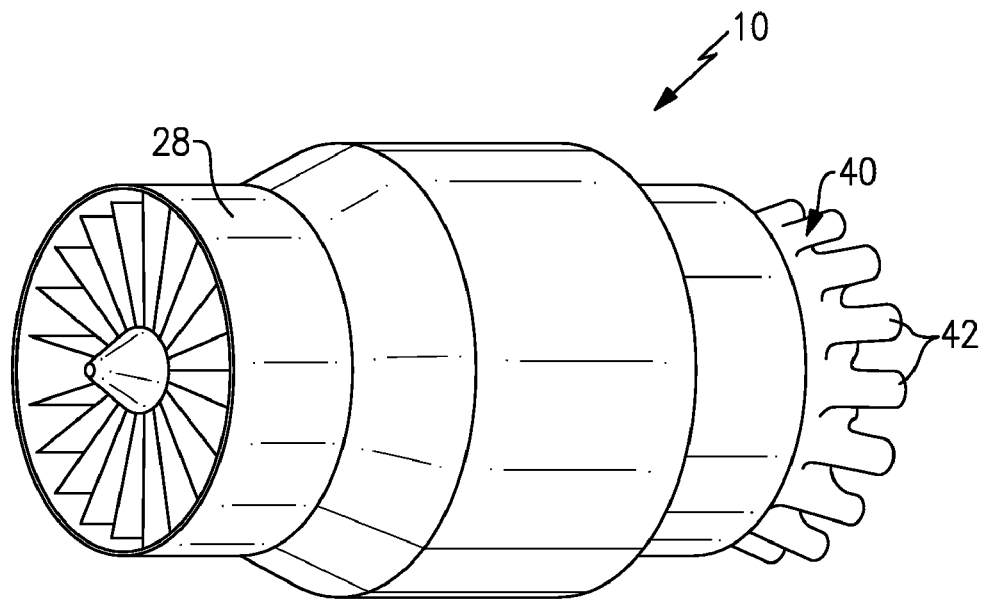
FIGS. 2A and 2B illustrate an example gas turbine engine including a mixer section.
Figure 2B:
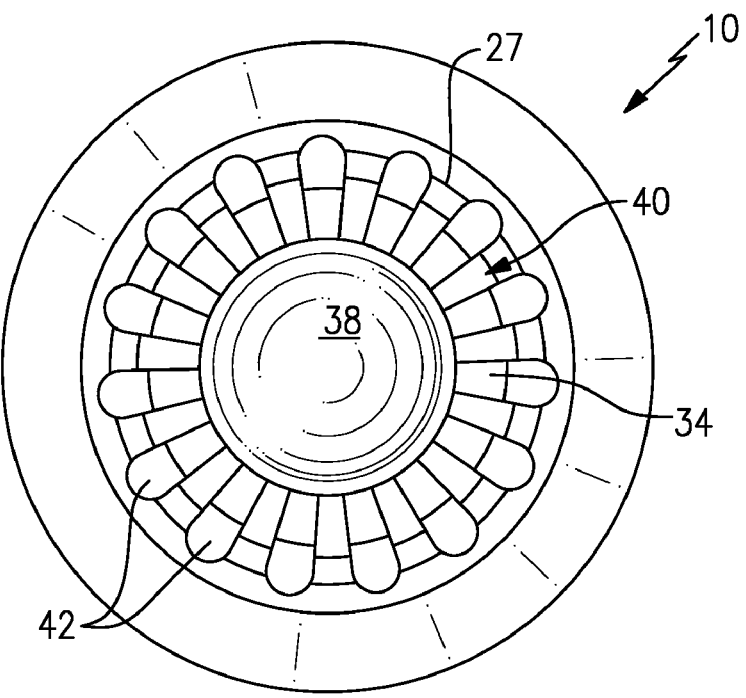

FIGS. 2A and 2B illustrates a mixer section 40 of the gas turbine engine 10. In this example, the gas turbine engine 10 is in the form of a mixed flow turbofan engine. The mixer section 40 includes a plurality of petals 42. The mixer section 40 communicates the fan airflow F1 radially inwardly from the fan bypass passage 27 into the petals 42 of the mixer section 40. Meanwhile, the mixer section 40 communicates the core airflow F2 radially outwardly from the core passage 34 into the petals 42. The mixer section 40 operates to mix the two gas flows and communicate the mixed gas flow through the exhaust nozzles 30, 36 at a relatively equal velocity. In certain applications, the mixing is helpful because the two gas flows are communicated at widely varying temperatures and pressures and by being combined together, form a single homogenous flow of gases to reduce overall engine noise.

Figure 3:
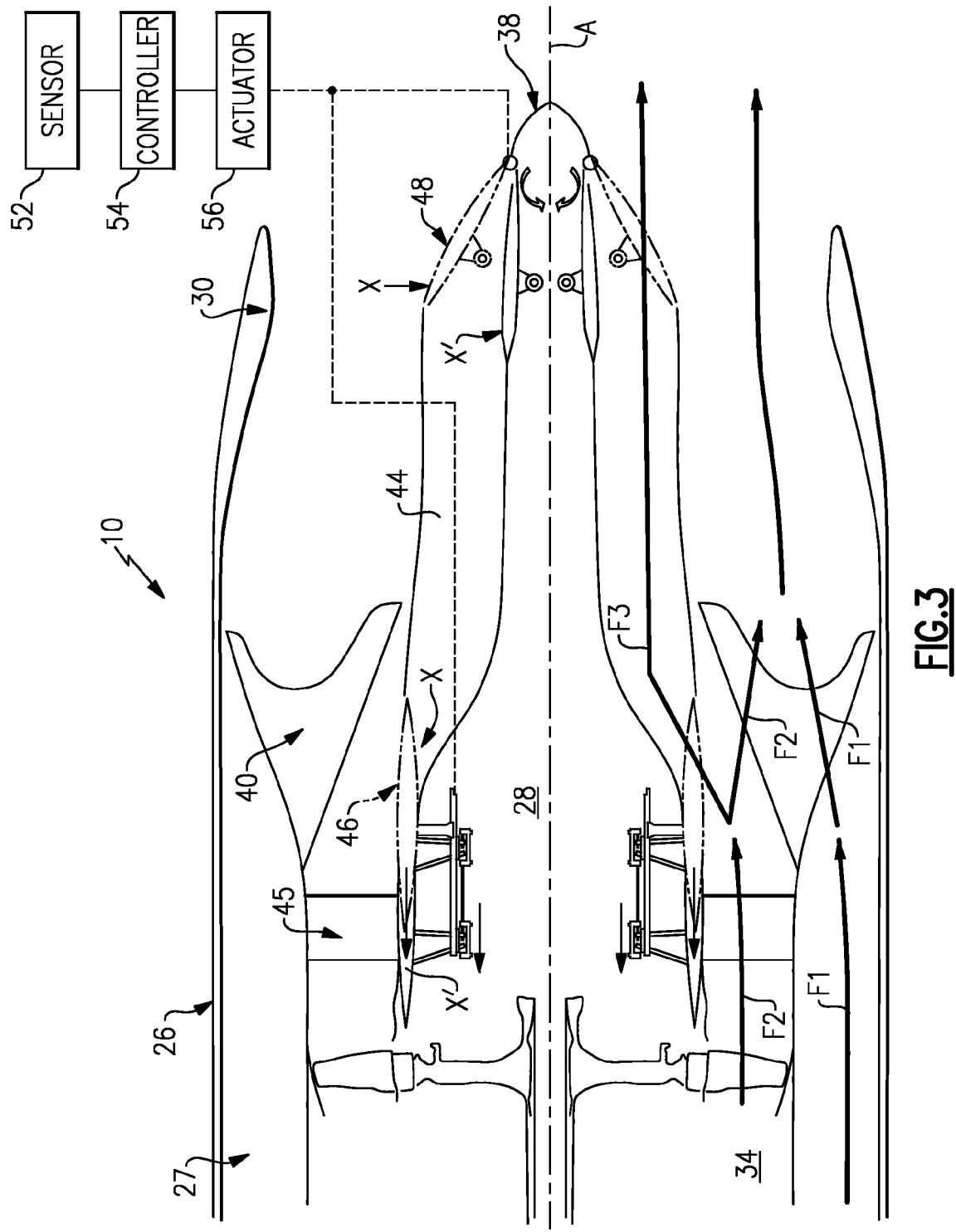
FIG. 3 illustrates the example gas turbine engine of FIGS. 2A and 2B having a core auxiliary duct passage.

FIG. 3 illustrates a core auxiliary duct passage 44 positioned within the core engine 28. The core auxiliary duct passage 44 is designed to increase the engine bypass ratio during certain operability conditions and thereby reduce engine noise, as is further discussed below. In one example, the core auxiliary duct passage 44 extends circumferentially about the entire circumference of the core engine 28. In another example, the core auxiliary duct passage 44 is an annular duct. In yet another example, the core auxiliary duct passage 44 includes a plurality of individual ducted passages disposed circumferentially about the engine centerline axis A. It should be understood that the example core auxiliary duct passage 44 is not shown to the scale it would be in practice. Instead, the core auxiliary duct passage 44 is shown larger than in practice to better illustrate its function. A worker of ordinary skill in this art will be able to determine an appropriate duct passage volume for a particular application, and thereby appropriately size the duct passage(s) 44.

The core auxiliary duct passage 44 includes an inlet 46 and an outlet 48. In one example, the inlet 46 is positioned upstream from the mixer section 40. In another example, the inlet 46 is positioned on the core engine 28 between a turbine exit guide vane 45 and the mixer section 40. The outlet 48 is positioned downstream from the mixer section 40, in this example. However, it should be understood that the inlet and outlet 46, 48 may be positioned at other locations of the gas turbine engine 10 and that these locations may vary depending upon design specific parameters including, but not limited to, the efficiency and noise requirements of the gas turbine engine 10.

The inlet 46 of the core auxiliary duct passage 44 selectively receives a portion F3 of the core airflow F2 that is communicated through the core passage 34 of the core engine 28 in response to specific operability conditions. The portion F3 of the core airflow F2 is communicated through the core auxiliary duct passage 44 and is discharged via the outlet 48.

Diverting a portion F3 of the core airflow F2 through the core auxiliary duct passage 44 increases the gas turbine engine 10 bypass ratio and thereby improves overall engine efficiency and reduces engine noise. Specifically, communicating airflow through the core auxiliary duct passage 44 enables an increased core airflow F2 through the core passage 34 and reduces any backpressure (e.g., pressure losses that result in reductions in engine efficiency) experienced by the low pressure turbine 22. In addition, diverting core airflow F2 away from the mixer section 40 enables the fan bypass airflow F1 to increase, thereby improving engine efficiency.

The inlet 46 and the outlet 48 are selectively translated to divert the portion F3 of the core airflow F2 into the core auxiliary duct passage 44. For example, opening the inlet 46 and the outlet 48 permits an airflow F3 to enter the core auxiliary duct passage 44, and closing the inlet 46 and the outlet 48 blocks any airflow F3 from entering the core auxiliary duct passage 44. The inlet 46 and the outlet 48 are selectively moveable between a first position X (i.e., a closed position, represented by phantom lines) to a second position X' (an open position, represented by solid lines) in response to detecting an operability condition of a gas turbine engine 10, for example. In another example, the inlet 46 and the outlet 48 are selectively moveable between a plurality of positions, each allowing a different amount of airflow F3 to enter the core auxiliary duct passage 44.

In one example, the operability condition includes a take-off condition. However, the inlet 46 and the outlet 48 may be selectively opened to the second position X', or to any intermediate position between the first position X and the second position X', in response to any known operability condition. In one example, a sensor 52 detects the operability condition and communicates a signal to a controller 54 to move the inlet 46 and the outlet 48 between the first positions X and the second positions X' via an actuator assembly 56. Of course, this view is highly schematic.

It should be understood that the sensor 52 and the controller 54 may be programmed to detect any known operability condition. Also, the sensor 52 can be replaced by any control associated with the gas turbine engine 10 or an associated aircraft. In fact, the controller 54 itself can generate the signal to cause the actuation of the inlet 46 and the outlet 48. The actuator assembly 56 returns the inlet 46 and the outlet 48 to the first position X during normal cruise operation (e.g., a generally constant speed at a generally constant, elevated altitude), in one example. The actuator assembly 56 may include any known type of actuator or combination of actuators that include hydraulic and electric actuation systems. In another example, the inlet 46 and the outlet 48 are returned to the first position X in response to detecting a climb condition.

Figure 4:
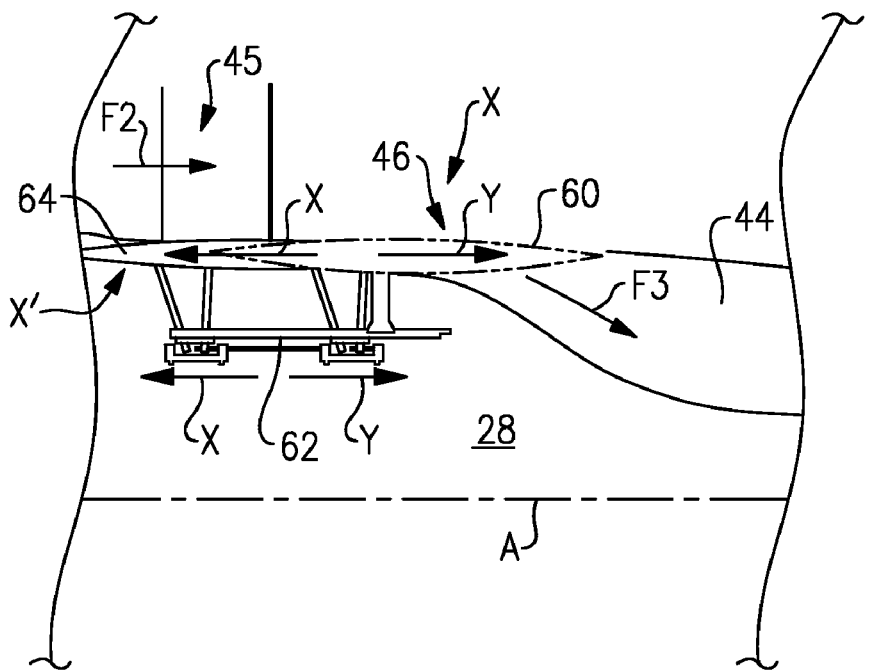
FIG. 4 illustrates an inlet portion of the core auxiliary duct passage illustrated in FIG. 3.

FIG. 4 illustrates the inlet 46 of the core auxiliary duct passage 44. In one example, the inlet 46 includes a door 60 and a door translating ring 62. The door 60 is selectively axially translatable in a direction X by the door translating ring 62 to expose the core auxiliary duct passage 44 and allow airflow F3 to be diverted from the core airflow F2. The door 60 is moved in a Y direction to return the inlet 46 to a closed position. Although only one door 60 is illustrated, it should be understood that a plurality of doors may be included depending upon the design and configuration of the core auxiliary duct passage 44. In an open position of the inlet 46 (i.e., the X' position), the door 60 is stored within a cavity 64 disposed within the core engine 28. A person of ordinary skill in the art having the benefit of this disclosure would understand that other methods may be utilized to translate the inlet 46 between the first position X and the second position X'.

Figure 5:
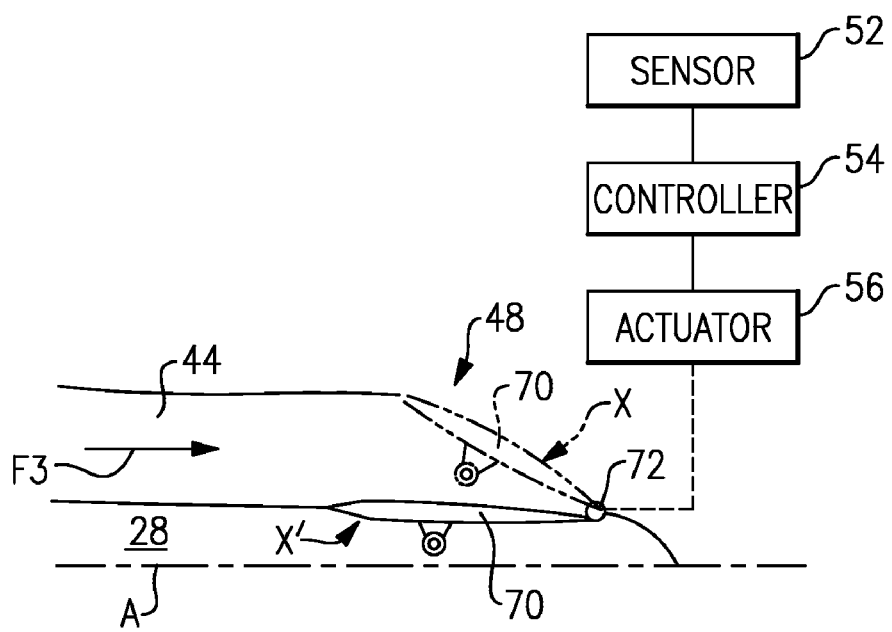
FIG. 5 illustrates an outlet portion of the core auxiliary duct passage illustrated in FIG. 3.

FIG. 5 illustrates the outlet 48 of the example core auxiliary duct passage 44. In the illustrated example, the outlet 48 includes a door 70 pivotable about a pivot 72. Although only one door 60 is illustrated, it should be understood that the outlet 48 can include a plurality of doors. The door 70 is pivotally mounted to the core engine 28 and is selectively moveable between the first position X and the second position X' to permit the airflow F3 that is communicated through the core auxiliary duct passage 44 to be discharged. In one example, the second position X' is counterclockwise from the first position X. In another example, the second position X' is clockwise from the first position X. The sensor 52 detects an operability condition, such as a takeoff condition, and communicates with a controller 54 to open the outlet via the actuator assembly 56. A person of ordinary skill in the art having the benefit of this disclosure would understand that other methods may be utilized to translate the outlet 46 between the first position X and the second position X'.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A gas turbine engine system, comprising:
a nacelle assembly defined about an axis;
a core engine positioned at least partially within said nacelle assembly and having a core passage and at least one core auxiliary duct passage, wherein said at least one core auxiliary duct passage includes an inlet for receiving a portion of a core airflow from said core engine and an outlet for discharging said portion of said core airflow, and at least one of said inlet and said outlet are selectively translatable to divert said portion of said core airflow into said at least one core auxiliary duct passage;
a mixer disposed between said nacelle assembly and said core engine;
wherein said inlet includes at least one door and a translating ring that selectively translates said at least one door; and
wherein said door of said inlet is stored in a cavity when translated to an open position of said inlet.

2. The system as recited in claim 1, wherein said inlet is positioned upstream from said mixer.

3. The system as recited in claim 1, wherein said outlet is positioned downstream from said mixer.

4. The system as recited in claim 1, wherein said outlet includes at least one door pivotable about a pivot.

5. The system as recited in claim 1, comprising a fan bypass passage disposed between said nacelle assembly and said core engine.

6. The system as recited in claim 1, comprising a fan exhaust nozzle positioned near a downstream end of said nacelle assembly and a core exhaust nozzle positioned near a downstream end of said core engine.

7. The system as recited in claim 1, wherein said at least one core auxiliary duct passage extends circumferentially about said core engine.

8. The system as recited in claim 1, wherein said mixer includes a plurality of petals.

9. The system as recited in claim 1, wherein said at least one core auxiliary duct passage is positioned radially inward of said core engine.

10. The system as recited in claim 1, wherein a second portion of said core airflow is communicated through said mixer.

11. The system as recited in claim 1, wherein said inlet is positioned between a turbine exit guide vane and said mixer.

12. A gas turbine engine system, comprising:
a nacelle assembly defined about an axis;
a core engine positioned radially inwardly from said nacelle assembly and including a compressor section, a combustor section and a turbine section,
said core engine including a core passage and at least one core auxiliary duct passage radially inward from said core passage and that axially extends between a turbine exit guide vane and a tail cone, wherein said at least one core auxiliary duct passage includes an inlet for receiving a first portion of a core airflow from said core engine and an outlet for discharging said first portion of said core airflow;
a first door that is axially translatable to open and close said inlet;
a second door that is moveable to open and close said outlet;
a mixer disposed between said nacelle assembly and said core engine, wherein a second portion of said core airflow is diverted through said mixer; and
a controller that produces a signal in response to detecting an operability condition and selectively translates said first door and said second door in response to said operability condition.

* * * * *